T. J. LINDSAY.
WIRE WHEEL HUB.
APPLICATION FILED SEPT. 6, 1913.
1,105,670.
Patented Aug. 4, 1914.
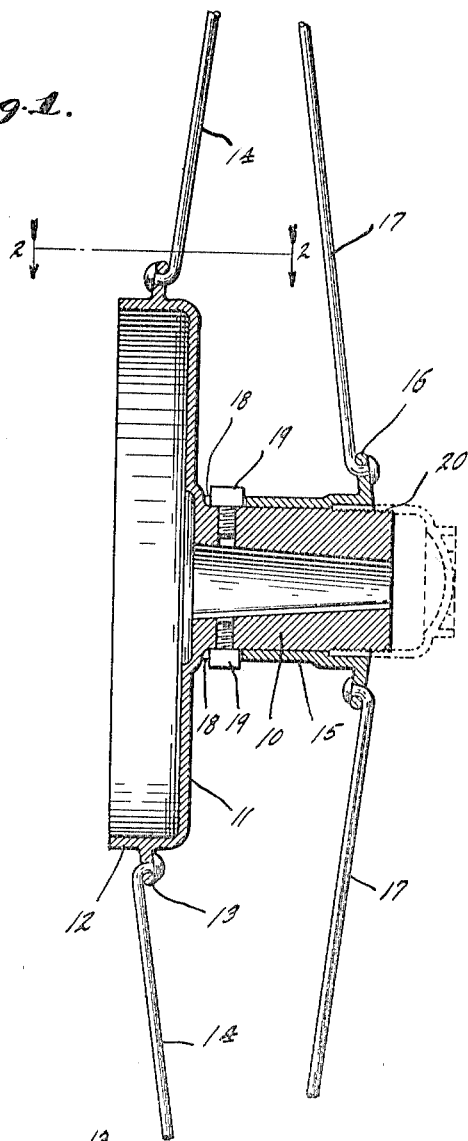
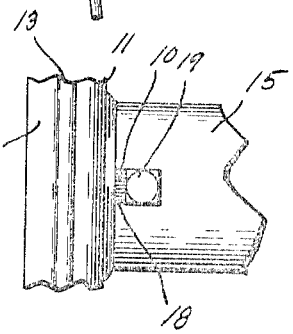
WITNESSES:
Frank A. Fable
Josephine Gasper
INVENTOR
Thomas J. Lindsay,
BY
Arthur M. Hood
ATTORNEY

UNITED STATES PATENT OFFICE.

THOMAS J. LINDSAY, OF INDIANAPOLIS, INDIANA.

WIRE-WHEEL HUB.

1,105,670.  Specification of Letters Patent.  Patented Aug. 4, 1914.

Application filed September 6, 1913. Serial No. 788,428.

*To all whom it may concern:*

Be it known that I, THOMAS J. LINDSAY, a citizen of the United States, residing at Indianapolis, in the county of Marion and State of Indiana, have invented a new and useful Wire-Wheel Hub, of which the following is a specification.

It is sometimes desirable in wire wheels that the hub have flanges of different size for the two sets of spokes, as because the flange for one set needs to be made larger to form part of a brake drum or a speedometer-driving gear. In such cases great difficulty is experienced in putting in the spokes in the smaller flange, such operation often being absolutely impossible without bending the spokes.

It is the object of my invention to provide a hub of this character while still allowing the easy association of spokes with the hub without distorting the spokes. In accomplishing this, I make one of the flanges as a part of a sleeve removably mounted on the main body of the hub, which main body carries the other flange.

The accompanying drawing illustrates my invention.

In this drawing, Figure 1 is an axial section through a hub embodying my invention; and Fig. 2 is a section of the line 2—2 of Fig. 1.

The hub 10, which is shown internally tapered to provide a convenient mounting, is provided at its inner end with a radially projecting flange 11 which in the present instance is shown with its outer edge forming a brake drum 12. The outer surface of this brake drum 12 is provided with a spoke flange 13, for receiving wire spokes 14. In the arrangement shown, this flange 13 and the drum 12 are both integral with the flange 11 and the hub 10, but this is not in all cases essential.

A sleeve 15 fits slidingly over the main body 10, and at its end remote from the flange 11 is provided with a spoke flange 16 for receiving spokes 17, the flange 16 being of smaller diameter than is the flange 13 and the spokes 17 being correspondingly longer than are the spokes 14. In order to prevent the sleeve 15 from turning on the main body 10, it is provided with notches 18 at its end opposite the spoke flange 16 to fit over the heads of lugs 19, these lugs conveniently being the heads of screws set into the main body 10 and prevent it from turning thereby by the locking action of the notches 18. With this arrangement, the sleeve 15 may be removed from the main body 10 for the purpose of allowing the spokes 17 to be inserted through the holes in the spoke flange 16. After these spokes are thus inserted, and their heads brought against the spoke flange, the sleeve 15 may be slipped back upon the main body 10. The lateral pull of the spokes 14 and 17 is normally sufficient to hold the sleeve in place on the main body 10, but when desired the outer end of the main body 10 may be threaded to receive a cap 20, shown in dotted lines, for locking the sleeve 15 in place, the outer end of said sleeve being internally rabbeted to receive the cap 20.

I claim as my invention:

1. A wheel hub, comprising the combination of a main body provided with a spoke flange, and a sleeve slidably mounted on said main body and also provided with a spoke flange, said two spoke flanges being of different size.

2. A wheel hub, comprising the combination of a main body provided with a spoke flange, and a sleeve slidably mounted on said main body and also provided with a spoke flange, said last named flange being of smaller diameter than the first named flange.

3. A wheel hub, comprising the combination of a main body provided with a spoke flange, a sleeve slidably mounted on said main body and also provided with a spoke flange, said two spoke flanges being of different size, and means for preventing relative rotation between said main body and said sleeve.

4. A wheel hub, comprising the combination of a main body provided with a spoke flange, a sleeve slidably mounted on said main body and also provided with a spoke flange, said last named flange being of smaller diameter than the first named flange, and means for preventing relative rotation between said main body and said sleeve.

5. In combination, a wheel hub, a brake drum carried thereby, said brake drum being provided with means for holding the inner ends of wire spokes, and a sleeve axially slidable on said hub and provided with a spoke-receiving flange which is smaller in diameter than is said brake drum.

6. In combination, a wheel hub, a brake drum carried thereby, said brake drum being provided with means for holding the inner ends of wire spokes, a sleeve axially slidable on said hub and provided with a spoke-receiving flange which is smaller in diameter than is said brake drum, and means for preventing relative rotation between said hub and sleeve.

7. A wheel hub, comprising the combination of a main body provided with a spoke flange, and a sleeve slidably mounted on said main body and also provided with a spoke flange, said two spoke flanges being of different size and the spoke holes in the smaller flange extending longitudinally of the hub.

8. A wheel hub, comprising the combination of a main body provided with a spoke flange, and a sleeve slidably mounted on said main body and also provided with a spoke flange, said last named flange being of smaller diameter than the first named flange and the spoke holes in said smaller flange extending longitudinally of the hub.

9. In combination, a wheel hub, a brake drum carried thereby, said brake drum being provided with means for holding the inner ends of wire spokes, and a sleeve axially slidable on said hub and provided with a spoke-receiving flange which is smaller in diameter than is said brake drum and is provided with spoke holes extending longitudinally of the hub.

10. In combination, a wheel hub, a brake drum and a spoke-receiving flange carried by said hub and one of them being removable from the hub, said spoke-receiving flange being smaller in diameter than is said brake drum, and said brake drum and said spoke-receiving flange both being provided with holes for spokes and the spoke holes in the spoke-receiving flange extending longitudinally of the hub.

11. In combination, a wheel hub, a brake drum and a spoke-receiving flange carried by said hub and one of them being removable from the hub, said spoke-receiving flange being smaller in diameter than is said brake drum, and said brake drum and said spoke-receiving flange both being provided with holes for spokes.

12. In combination, a wheel hub having a radial flange, a brake drum carried by said hub, and a flanged sleeve axially slidable on said hub and provided with means for holding the inner ends of wire spokes, said sleeve and hub being interconnected to prevent relative rotation between them.

In witness whereof, I, have hereunto set my hand at Indianapolis, Indiana, this fourth day of September, A. D. one thousand nine hundred and thirteen.

THOMAS J. LINDSAY.

Witnesses:
FRANK A. FAHLE,
MAY LAYDEN.